United States Patent
Diep

(10) Patent No.: US 11,299,277 B2
(45) Date of Patent: Apr. 12, 2022

(54) AIRCRAFT BED

(71) Applicant: Chuong T. Diep, Tustin, CA (US)

(72) Inventor: Chuong T. Diep, Tustin, CA (US)

( * ) Notice: Subject to any disclaimer, the term of this patent is extended or adjusted under 35 U.S.C. 154(b) by 0 days.

(21) Appl. No.: 16/241,848

(22) Filed: Jan. 7, 2019

(65) Prior Publication Data

US 2019/0217956 A1 Jul. 18, 2019

Related U.S. Application Data

(60) Provisional application No. 62/617,394, filed on Jan. 15, 2018.

(51) Int. Cl.
*B64D 11/06* (2006.01)
*A47C 17/16* (2006.01)
*B64D 11/00* (2006.01)

(52) U.S. Cl.
CPC .......... *B64D 11/0641* (2014.12); *A47C 17/16* (2013.01); *B64D 2011/0069* (2013.01)

(58) Field of Classification Search
CPC ......... A47C 17/16; A47C 17/04; A47C 17/34; B64D 11/0641; B64D 2011/0069; B64D 2011/0076; B64D 2011/0092; B60N 2/34
USPC .......................................................... 297/63
See application file for complete search history.

(56) References Cited

U.S. PATENT DOCUMENTS

| | | | | |
|---|---|---|---|---|
| 316,013 A * | 4/1885 | Cutler | ............. | B61D 31/00 297/67 |
| 5,181,286 A * | 1/1993 | McNulty | ............. | A47C 17/80 114/189 |
| 5,992,798 A | 11/1999 | Ferry | | |
| 7,188,806 B2 | 3/2007 | Beroth | | |
| 7,517,010 B2 * | 4/2009 | Saint-Jalmes | .......... | B64D 11/06 244/118.5 |
| 7,845,718 B1 * | 12/2010 | Bosstick | ............. | B60N 2/345 297/118 |
| 9,033,413 B2 * | 5/2015 | Round | .............. | B64D 11/06 297/232 |
| 2007/0102975 A1 * | 5/2007 | Gardner | .............. | B60P 3/39 297/245 |
| 2008/0010743 A1 * | 1/2008 | Richardson | .......... | B60P 3/39 5/118 |
| 2017/0172306 A1 * | 6/2017 | Serure | .............. | A47C 17/34 |
| 2018/0027964 A1 * | 2/2018 | Serure | .............. | A47C 17/34 |

* cited by examiner

*Primary Examiner* — Mark R Wendell

(74) *Attorney, Agent, or Firm* — Morland C. Fischer

(57) ABSTRACT

Disclosed herein is a portable bed having particular application for use in an aircraft. The aircraft bed includes a folding frame and a folding mattress to lay on and be supported by the folding frame. The folding frame includes a plurality of upstanding panels that are hingedly coupled side-to-side one another so that the frame can be collapsed from an expanded unfolded configuration at which to support the mattress to a compact folded configuration at which to be suitable for storage. In one embodiment, the folding frame is located between a pair of aircraft seats that face one another, and the mattress extends between the seat portions of the facing seats. In another embodiment, the folding frame is located between an aircraft seat and an upstanding structure (e.g., a wall) of the aircraft, and the mattress extends between the reclined back portion of the aircraft seat and the upstanding structure by way of the folding frame.

22 Claims, 8 Drawing Sheets

AIRCRAFT BED

CROSS REFERENCE TO RELATED PATENT APPLICATIONS

This application is related to Provisional Patent Application No. 62/617,394 filed Jan. 15, 2018.

BACKGROUND OF THE INVENTION

Field of the Invention

The present invention relates to an article of manufacture for use in an aircraft. In particular, disclosed herein is a folding bedframe and a folding mattress to lay on the bedframe for creating a portable bed to be located between a pair of aircraft seats that face one another or between an aircraft seat and an adjacent upstanding aircraft structure, such as a wall or closet.

Background Art

Sleeping in an aircraft presents problems due, among other things, to space constraints. As a result, conventional aircraft beds are typically required to use the space occupied by an existing aircraft seat. For example, some aircraft beds depend upon reclining aircraft seats. These reclining seat beds typically provide an uneven or "V" shaped surface on which a passenger must sleep. Another aircraft bed relies on a pair of aircraft seats that face one another to make a bed or on an aircraft seat that faces an adjacent structure of the aircraft to make a bed. One example of a known aircraft bed uses an inflatable bladder that extends between the pair of opposing seats and a mattress lying atop the bladder and the seat bottoms. An air pump must be available to inflate the bladder. The problems inherent with this aircraft bed include the risk of the bladder deflating or sustaining punctures that render the conventional bed useless.

SUMMARY OF THE INVENTION

The present invention relates to a portable bed having a folding bed frame and a folding mattress having particular application for use in an aircraft. In a preferred embodiment, the aircraft bed includes a folding frame that extends between a pair of seats that face one another and a mattress to be seated atop the folding frame when the frame is unfolded. The folding frame has a plurality of upstanding side panels extending in a vertical direction to support the mattress and a plurality of hinges joining adjacent side panels to one another to surround a plurality of open cells enclosed by the panels. The folding mattress has a central torso section located between head and foot sections and a plurality of horizontal hinges joining the head and foot sections to opposite ends of the central torso section. The central torso section of the mattress includes a layer of memory foam overlaying a layer of hard foam, wherein the layer of hard foam has a density greater than three pounds per cubic foot. With the folding frame unfolded and the bed deployed, the central torso section of the mattress lies atop the folding frame, and the head and foot end sections rest on respective ones of the seat portions of the aircraft seats.

In another preferred embodiment, the portable aircraft bed comprises a folding frame that is located between a single aircraft seat and an opposing upstanding structure (e.g., a wall) of the aircraft and a folding mattress for resting atop the folding frame when the mattress is unfolded. The folding frame has a plurality of upstanding side panels extending in a vertical direction to support the mattress and a plurality of hinges joining adjacent side panels to one another to surround a plurality of open cells enclosed by the panels. The folding mattress includes a relatively long torso section that lies atop the folding frame and two relatively short head and neck sections that are pivotally connected to each other and to the torso section. With the back portion of the aircraft seat reclined backwards, the head and neck sections of the folding mattress are rotated relative to the torso section so as to lie upon the reclined back portion of the aircraft seat.

The folding bed frame and folding mattress are more reliable than air beds which have an inflatable bladder and require an air pump. The folding frame has a compact zig-zag or accordion-like orientation to limit the expansion of the frame when it is unfolded and to increase its load bearing capacity. Pairs of seat belts extend from each of the opposite ends of the folding frame to be attached to the existing seat belts of the aircraft seats whereby to attach the frame to the seats.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

DESCRIPTION OF THE PREFERRED EMBODIMENTS

The disclosure provided herein describes examples of some embodiments of an aircraft bed. The designs, figures, and descriptions are non-limiting examples of the embodiments they disclose. For example, other embodiments of the disclosed aircraft bed may or may not include the features described herein. Moreover, disclosed advantages and benefits may apply to only certain embodiments of the invention and should be used to limit the disclosed invention.

Figure 1A:
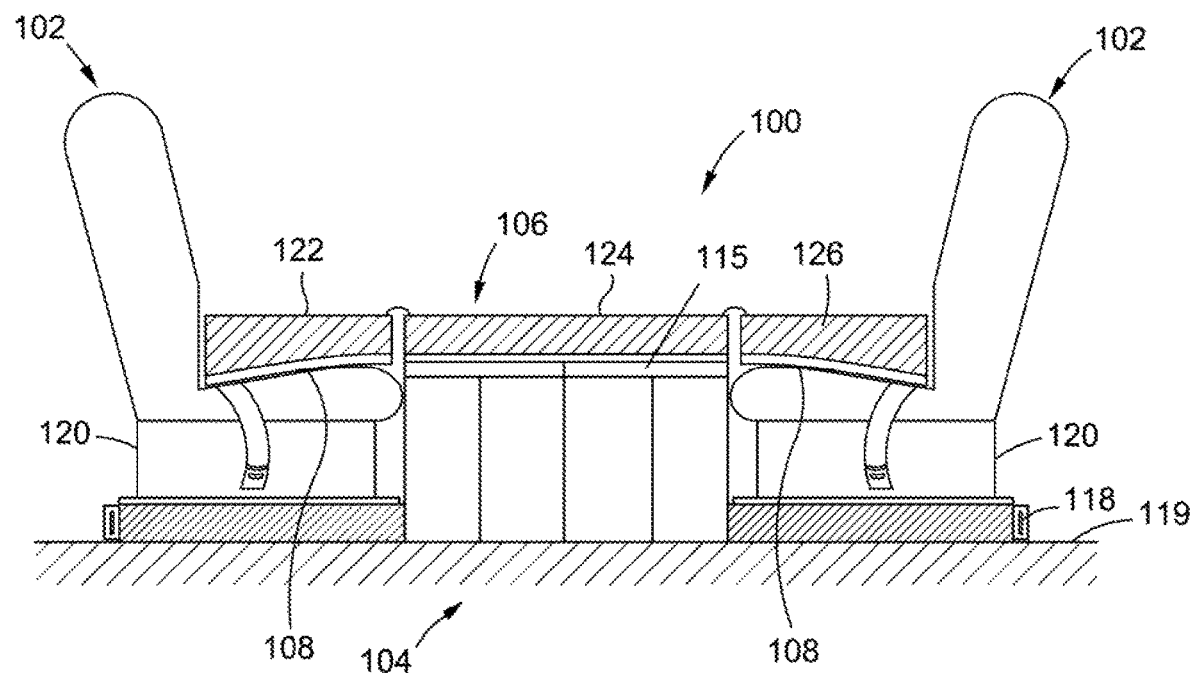
FIG. 1A shows a portable bed according to one preferred embodiment including a folding frame and a folding mattress laying unfolded on the frame, wherein the bed extends between a pair of aircraft seats that face one another.

FIG. 1A shows a pair of seats 102 of the kind commonly found in an aircraft that are separated and facing one another with a portable bed 100 located in the space therebetween. The bed 100 includes a folding mattress 106 that is supported by a folding frame 104 below the middle of the mattress and further supported by the seat portions of the pair of facing aircraft seats 102 below the opposite ends of the mattress. However, it is to be understood that the portable bed 100 shown in FIG. 1 could also be found at other locations, such as for example, in a train, a bus, a boat or a residence.

As shown, the facing seats 102 rest on a floor 119 or similar support structure of the aircraft. The folding frame 104 may be secured to seat bases 120 attached to the floor 119. For example, the folding frame 104 may be secured by seat belts or similar straps such as straps with buckles 118 that encircle the bases.

Figure 1B:
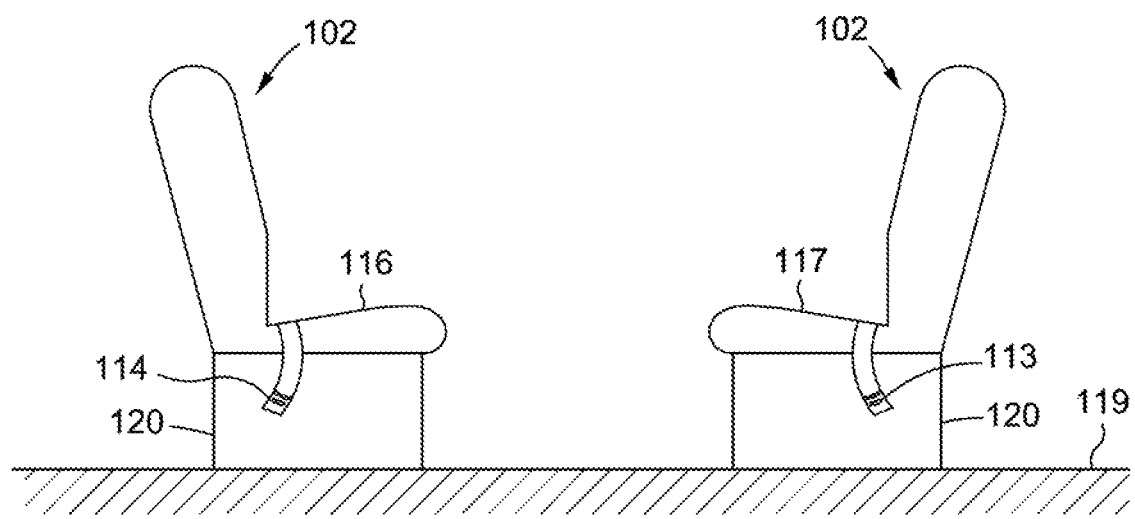
FIG. 1B shows the pair of aircraft seats of FIG. 1A with the portable bed removed therefrom.

FIG. 1B shows the facing seats 102 without the portable bed 100 located therebetween. Seat belts are included as usual to secure passengers in their seats. One of a first pair of seat belts 113 is shown hanging down from one side of a first seat 102, and one 114 of a second pair of seat belts is shown hanging down from one side of the second seat 102. The matching seat belts (designated 116 and 117) from the first and second pairs of seat belts to be coupled to the seat belts 113 and 114 are not visible in FIG. 1B.

Figure 1C:
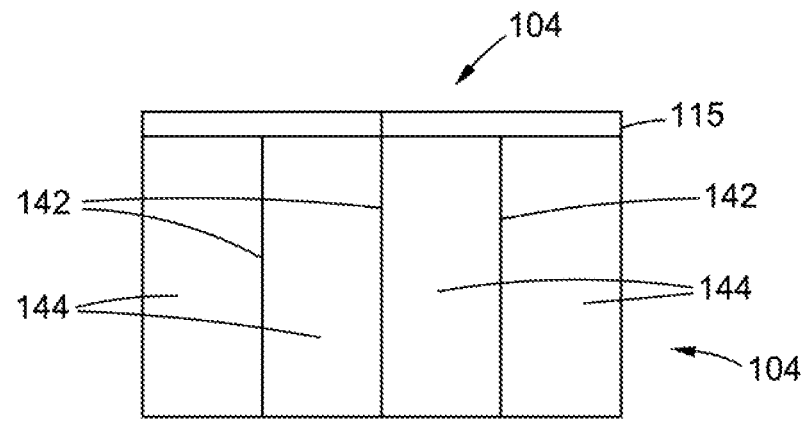
FIG. 1C shows one side of the folding frame of the bed of FIG. 1A.

FIG. 1C shows the folding frame 104 removed from between the pairs of seats 102 of FIG. 1A. The folding frame 104 may be folded from side-to-side but not from top to bottom. The folding frame 104 is shown supporting a removable top 115 having one or more sections. As will be explained in greater detail hereinafter, the top may include two sections that are hinged to opposite ends of the folding frame and designed to rotate in one direction for supporting the mattress thereon and in an opposite direction for storage.

The folding frame 104 includes a plurality of upstanding vertical side panels 144 that are aligned side-by-side and pivotally connected one to another by means of vertical hinges 142 that run along fold-line boundaries between adjacent side panels 144. The hinges 142 may be metallic or fabric and continuous or discontinuous. By way of example only, the hinges 142 may be conventional piano hinges.

Figure 1D:
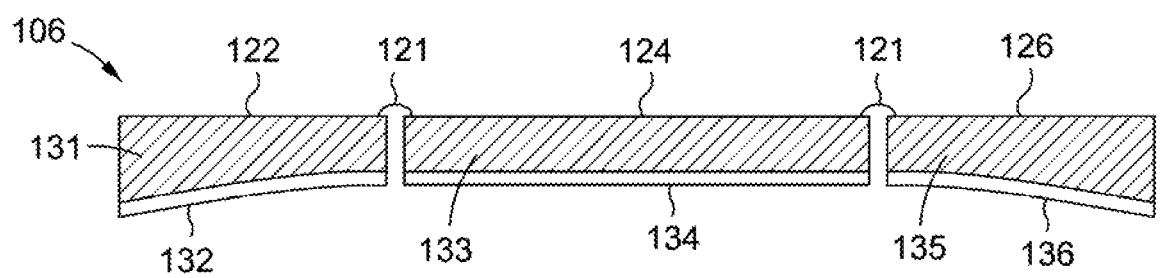
FIG. 1D is a partial cross-section of the folding mattress that is shown removed from the folding frame of the bed of FIG. 1A.

FIG. 1D shows the folding mattress 106 after being removed from the folding frame 104 lying between the pair of seats 102 of FIG. 1A. The mattress 106 preferably has two or more folding sections. For example, three folding mattress sections (i.e., a torso section 124 and head and foot sections 122 and 126) are shown. The mattress sections are pivotally coupled end-to-end each other by rotating hinges 121 such as fabric hinges. The hinges 121 run vertically along fold-line boundaries between adjacent mattress sections 122, 124 and 124, 126.

The folding mattress 106 includes a soft foam or memory foam upper layer and a lower layer that is harder when compared with the upper layer. For example, the torso section 124 in the middle of the mattress 106 overlying the folding frame 104 of FIG. 1A includes a relatively soft memory foam upper layer 133 and a harder foam lower layer 134. The soft upper layer 133 can be a single or multiple layers. The harder foam lower layer 134 may be polyurethane. The harder foam lower layer 134 may have a density of one to three pounds per cubic foot (pcf), or a density of three to ten pcf, or a density of three to twenty pcf. The harder foam lower layer 134 may have a compressive strength parallel to the rise of twenty to forty-six pounds per square inch (psi), or forty-six to three hundred psi, or three hundred to five hundred fifty psi, all compressive strengths being measured at 75 degrees Fahrenheit. Rigid foams like those described above are available from General Plastics Manufacturing Company of Tacoma, Wash.

The memory foam upper layer 133 of the middle torso section 124 of the folding mattress 106 may be attached to the harder foam lower layer 134 by using adhesives, hook and loop fasteners, and the like. It is preferable that the memory foam upper layer 133 be uniformly and completely fixed to the harder lower layer 134 to prevent mattress "creep" or movement of the mattress away from the folding frame 104 on which the mattress 106 will be laid.

The outside head and foot sections 122 and 126 of the folding mattress 106 that are pivotally coupled to opposite ends of the middle torso section 124 may have only a memory foam layer 131 and 135. Alternatively, each of the outside mattress sections 122 and 126 may have both a memory foam upper layer 131 and 135 and a hard foam lower layer 132 and 136. The hard foam lower layers 132 and 136 of mattress sections 122 and 126 may be of any of those described above.

Figure 2A:
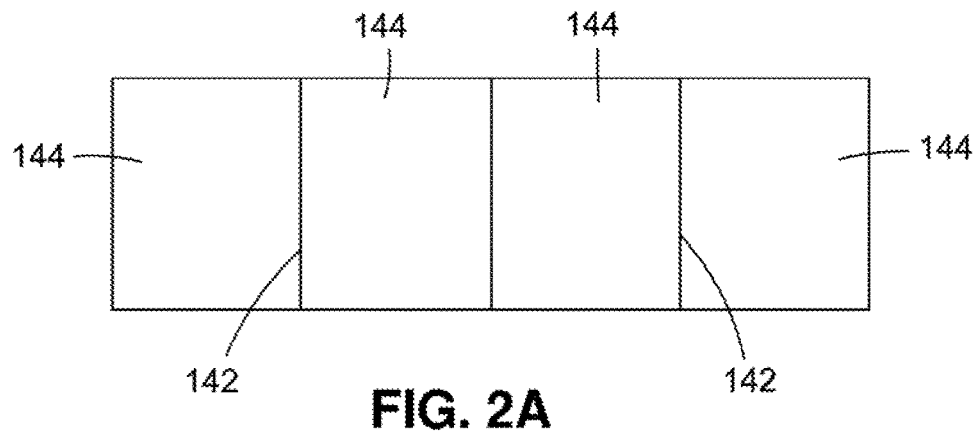
FIG. 2A is a side view of the folding frame of the portable bed shown in FIG. 1A.
Figure 2B:
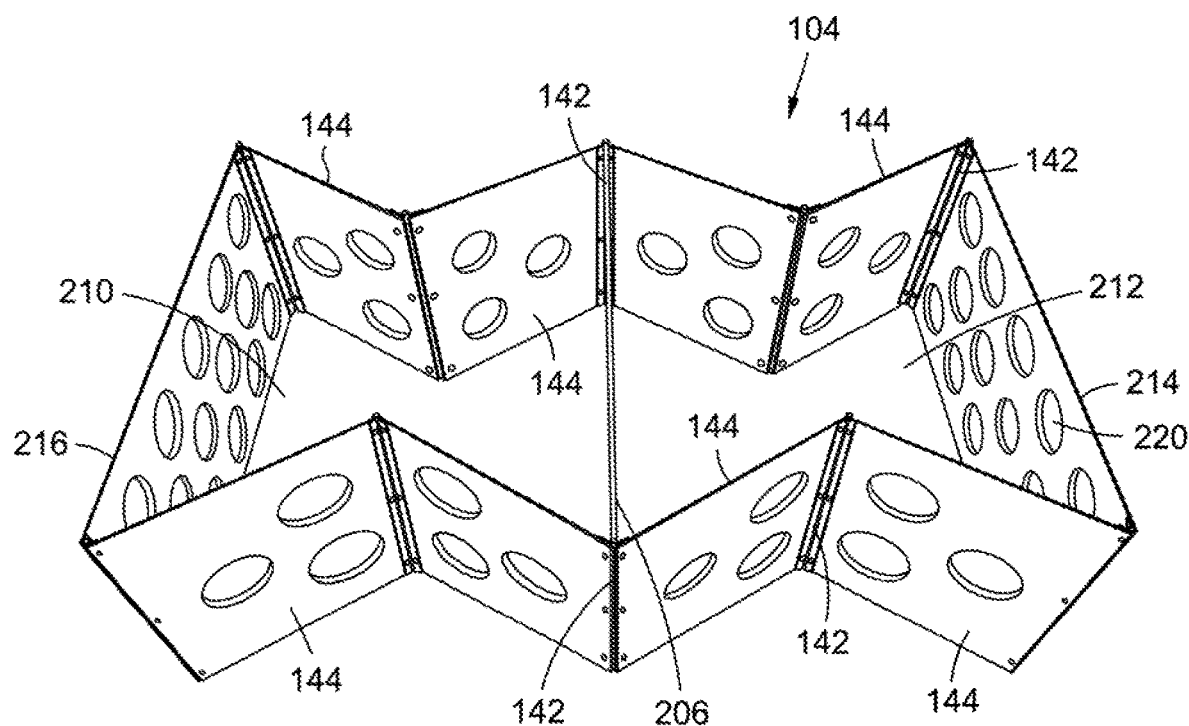
FIG. 2B shows a perspective view of the folding frame deployed and ready for use in an unfolded configuration.

FIG. 2A shows one of the identical opposite sides of the folding frame 104 as deployed in its unfolded or expanded configuration. FIG. 2B shows a perspective view of the folding frame 104 in its unfolded configuration. As shown in FIG. 2B, each of the opposite sides of the folding frame has a zig-zag or accordion-like appearance when the frame is expanded to its unfolded configuration at which to receive and support the mattress thereon.

As previously described, a number of upstanding vertical side panels 144 are located at each of the opposite sides of the folding frame 104. By way of example, four upstanding side panels 144 are shown, but other numbers of side panels may also be used. As was also previously explained, each upstanding side panel 144 is pivotally coupled to its adjacent side panel by a vertical hinge 142. While piano-style hinges have been described, various hinge types may also be used including fabric and metallic hinges and living hinges having score lines of reduced thickness along which bending takes place. In this regard, the opposing ends of the vertical hinges 142 that lie at the intersection of adjacent side panels 144 and abut one another are angled so as to prevent the folding frame 104 from expanding outwardly beyond its zig-zag accordion-like configuration of FIG. 2B. This zig-zag configuration prevents an over-rotation of adjacent pairs of side panels 144 and limits the expansion of the frame 104 so that the load can be better distributed. To this end, the folding frame 104 in its unfolded zig-zag configuration of FIG. 2B is preferably adapted to carry a vertical load of about 500 pounds.

As best shown in FIG. 2B, the upstanding side panels 144 divide the folding frame 104 into identical hourglass-shaped first and second cells 210 and 212. However, the number of upstanding side panels may increase to surround additional cells. A dividing panel 206 extends laterally across the folding frame 104 midway between opposite end panels 214 and 216 thereof to separate the first and second cells 210 and 212 from one another. The side panels 144 and the end panels 214 and 216 are articulated at hinges 142, such that collapsing (i.e., rotating) the folding frame 104 inwardly between the end panels 214 and 216 and towards the dividing panel 206 folds all of the panels towards one another and into a stack with the side panels arranged one above the other in substantially parallel alignment (best shown in FIG. 2E). Rotating the side panels 144 outwardly and away from one another opens and expands the folding frame 104 to its unfolded configuration.

The side and end panels 144, 214 and 216 of the folding frame 104 can be made from wood, metal, plastic, twinwall, polycarbon twinwall, a composite material, carbon fiber, carbon fiber nomex, aluminum, titanium, fiberglass and the like. The panels may have optional cutouts 220 to reduce the mass of the folding frame 104. The cutouts 220 can be arranged in a honeycomb pattern.

Figure 2C:
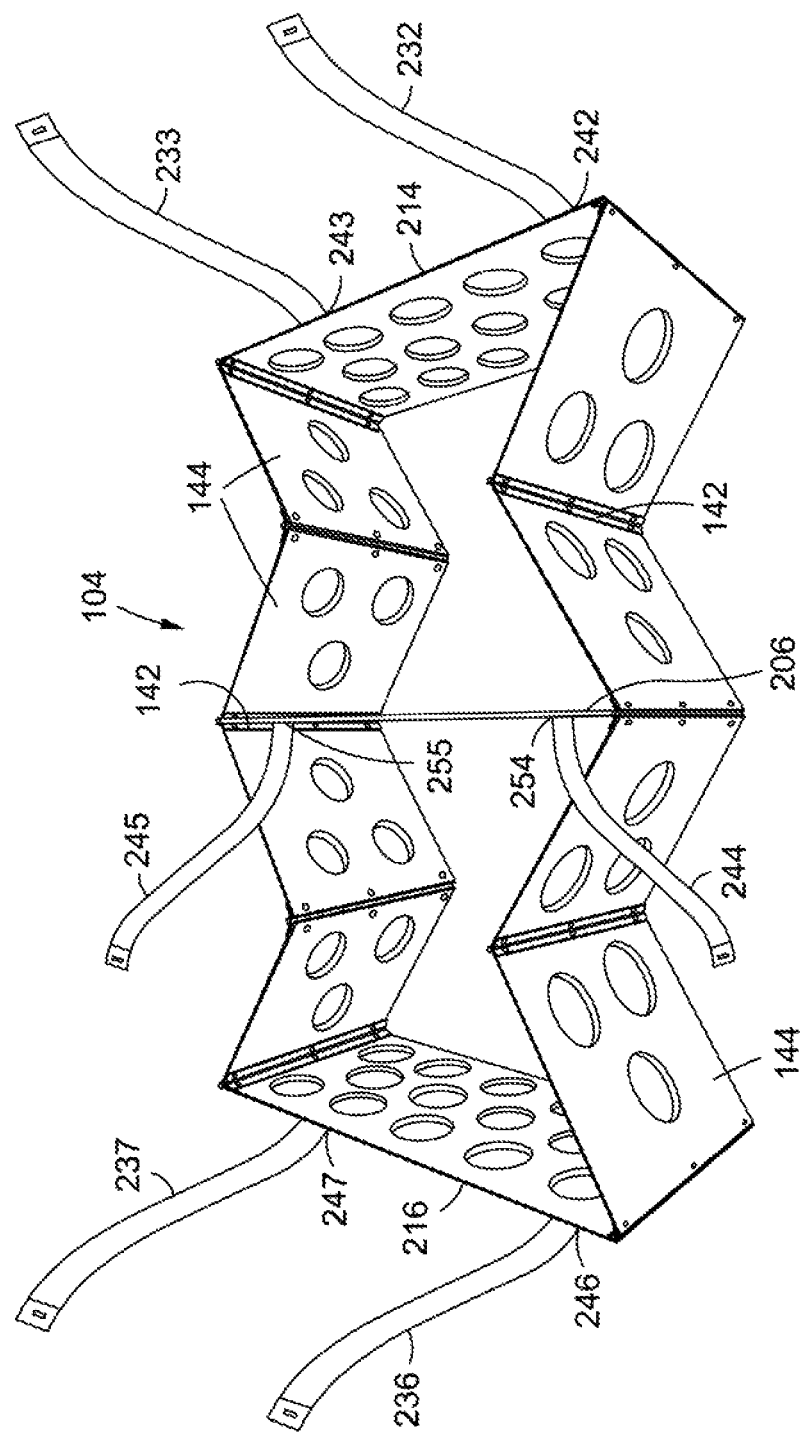
FIG. 2C shows the folding frame of FIG. 2B having seat belts extending therefrom to be joined to the existing seat belts of the aircraft seats.

FIG. 2C shows the folding frame 104 of FIG. 2B with auxiliary seat belts or similar attachment straps. A first pair of auxiliary seat belts 236 and 237 extend from the end panel 216 at the left end of the folding frame 104, and a second pair of auxiliary seat belts 232 and 233 extend from the opposite end panel 214 at the right end of the folding frame. These seat belts are used to attach the folding frame 104 to the aircraft. For example, the pairs of belts 236, 237 and 232, 233 may surround respective ones of the aircraft seats 102 shown in FIG. 1A which face one another or surround the bases 120 that lie below the aircraft seats 102.

As another option, the auxiliary seat belts at the end panels 214 and 216 of the folding frame 104 may be connected to the standard seat belts from the aircraft seats 102. For example, one of the pair of auxiliary seat belts 236 extending from the end panel 216 of the folding frame 104 may join a first standard seat belt 114 at one side of one seat 102 shown in FIG. 1B, and the second of the pair of auxiliary seat belts 237 may join another standard seat belt 116 at the opposite side of the seat 102. Likewise, one of the pair of auxiliary seat belts 232 extending from the end panel 214 of the folding frame 104 may join a first standard seat belt 113 at one side of the other seat 102, and the second of the pair of auxiliary seat belts 233 may join another standard seat belt 117 at the opposite side of the other seat 102.

Opposite ends of the auxiliary seat belts 236 and 237 at the left end of the folding frame 104 are connected to the folding frame 104 at attachment points 246 and 247 with the left end panel 216. Opposite ends of the auxiliary seat belts 232 and 233 at the right end of the folding frame 104 are connected to the folding frame 104 at attachment points 242 and 243 with the right end plate 214.

In addition to the seat belts used to fix the folding frame 104 to the aircraft, substitute passenger restraint belts 244 and 245 of FIG. 2C may also be used in place of the standard seat belts 114, 116 and 113, 117 of FIG. 1B. One end of each passenger restraint belt 244 and 245 is attached to one end of the dividing panel 206 which extends laterally across the folding frame 104. When they surround a sleeping passenger, joining the opposite free ends of the passenger restraint belts 244 and 245 to one another holds the passenger against the folding frame 104 which is in turn is fixed to the aircraft, for example by the pairs of auxiliary seat belts 232, 233 and 236, 237, as just explained.

Figure 2D:
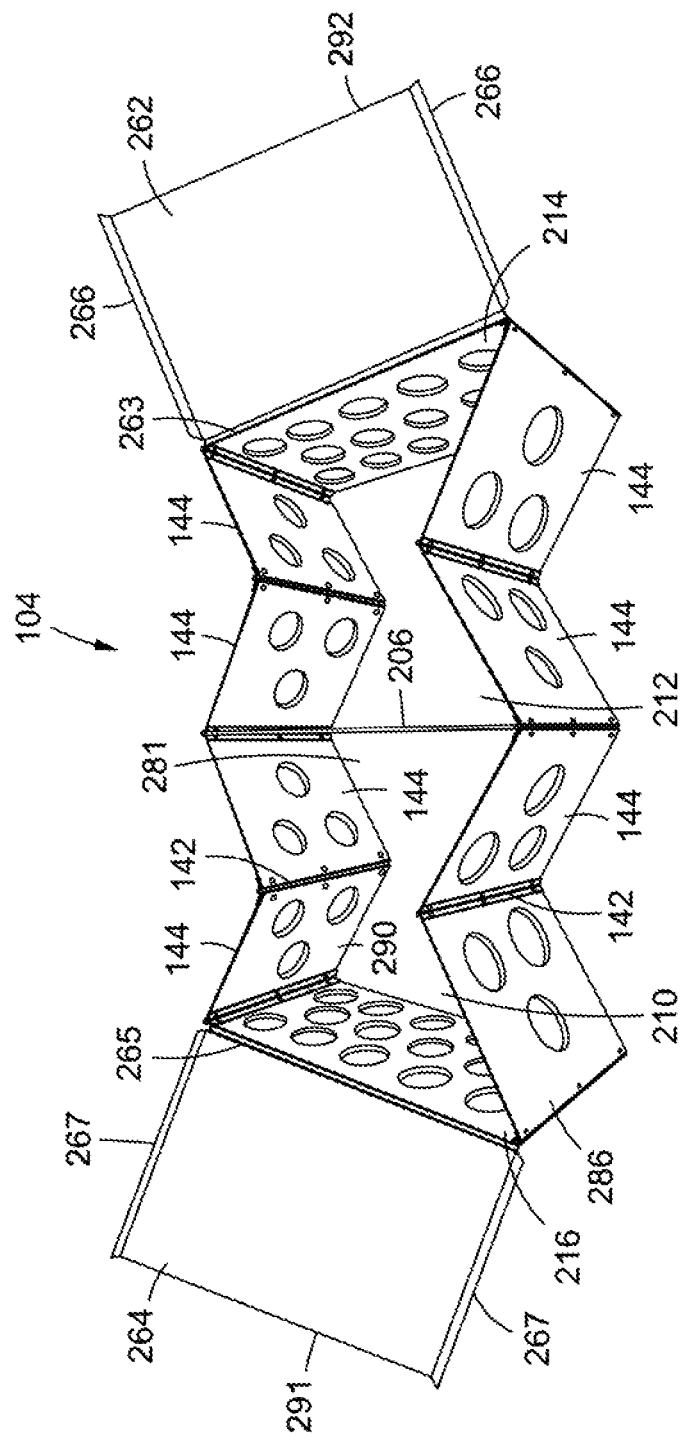
FIG. 2D shows the folding frame of FIG. 2B with a pair of pivotally connected top covers rotated upwardly and off the frame.

FIG. 2D shows the folding frame 104 of FIG. 2B in its unfolded configuration with the aforementioned top (designated 115 in FIG. 1C) extending thereover. In a preferred embodiment, the top of the folding frame includes a pair of top covers 262 and 264. However, the folding frame shown in FIG. 2D is devoid of the belts 232, 233, 236, 237, 244 and 245 simply for the purpose of convenience.

The top covers 262 and 264 are pivotally connected to respective end panels 214 and 216 of the folding frame 104 by means of joints such as, for example, horizontal hinges 263 and 265. Any number and type of hinges may be used including fabric and metallic hinges, separated hinges, or score lines of reduced thickness along which bending and rotation takes place.

Figure 2E:
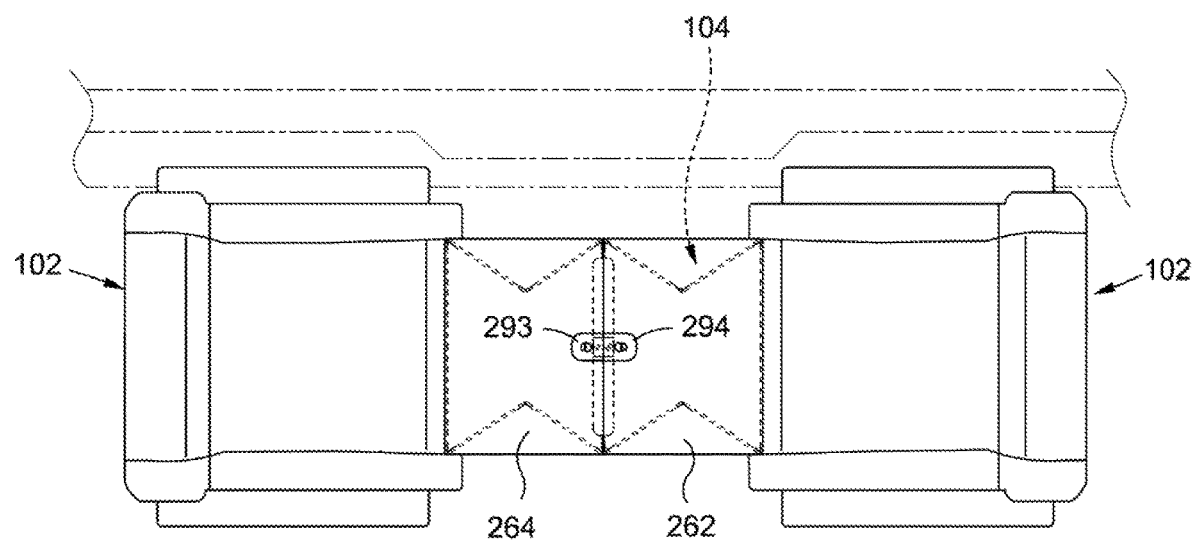
FIG. 2E is a top view showing the portable bed extending between the pair of aircraft seats of FIG. 1A with covers rotated over the top of the folding frame to be attached end-to-end by a pair of latches.
Figure 2F:
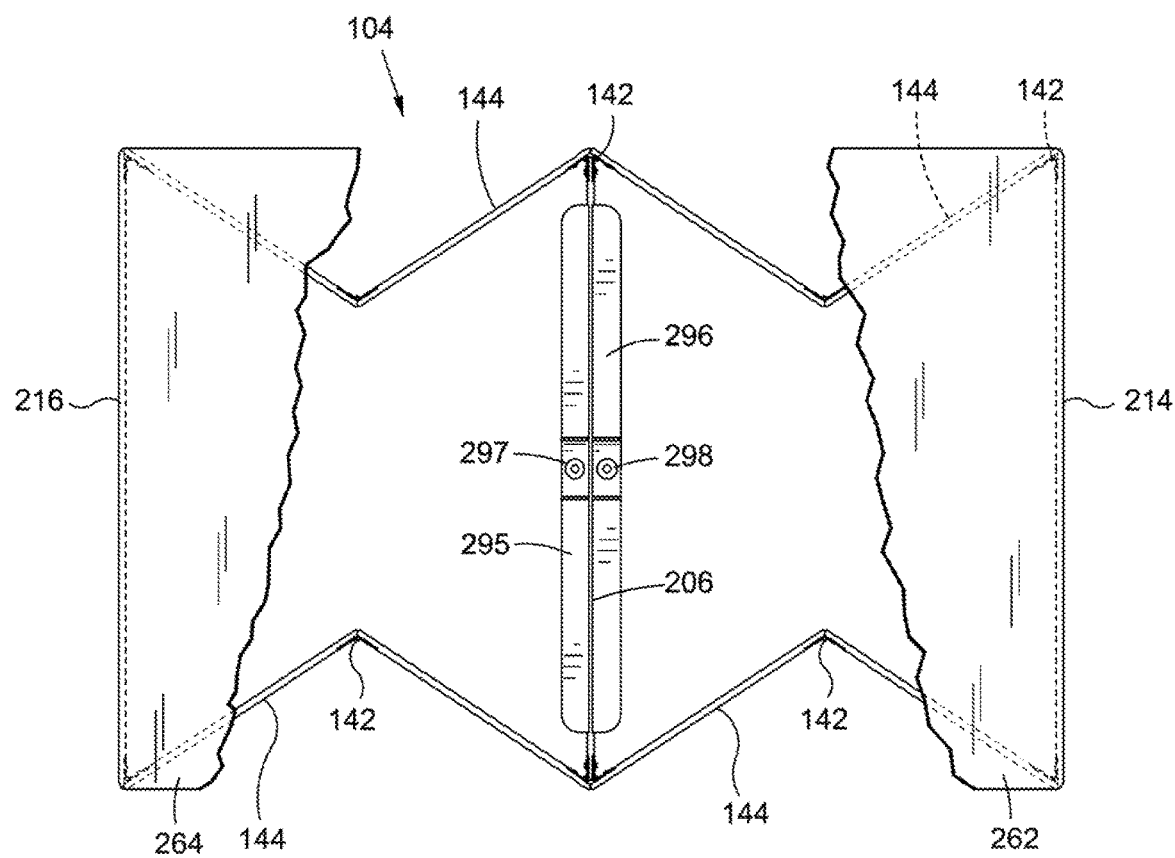
FIG. 2F is an enlarged top view of the folding frame showing the covers rotated over the top thereof and seated upon top cover seating shelves that extend from a dividing panel of the folding frame.

As will be discussed below and as is best show in FIGS. 2E and 2F, when the top covers 262 and 264 are rotated at their hinges 263 and 265 downwardly towards one another and the dividing panel 206 of the folding frame 104, they will come to rest on top of the upstanding vertical side panels 144 so as to cover the open cells 210 and 212 of the frame 104. As an option, each of the opposing outside ends 291 and 292 of the top covers 262 and 264 has a locking latch 293 and 294 mounted thereon (best shown in FIG. 2E). Moreover, and as is best shown in FIG. 2F, a top cover seating shelf 295 and 296 extends horizontally outward from opposite sides of the dividing panel 206 that extends laterally across the middle of the folding frame 104. A pair of locking posts 297 and 298 lie adjacent one another and stand upwardly from about the midpoint of respective top cover seating shelves 295 and 296.

When the top covers 262 and 264 are rotated towards one another and the dividing panel 206 by which to lie on top of the vertical side panels 144 of the folding frame 104, the outside ends 291 and 292 of the top covers are aligned end-to-end and seated on the top cover seating shelves 295 and 296. At the same time, the locking posts 297 and 298 that stand upwardly from the seating shelves 295 and 296 will be received inwardly of the locking latches 293 and 294 that rotate along with the top covers 262 and 294. The locking latches 293 and 294 are detachably connected to one another to retain the top covers 262 and 264 atop the folding frame 104. By virtue of the foregoing, the folding frame 104 is correspondingly locked in a unitary zig-zag configuration as shown in FIG. 2F to reliably support the folding mattress 106 thereon and ensure that the frame will not collapse and the bed 100 will remain in place between the aircraft seats 102 of FIG. 2E during takeoff, landing and air turbulence.

The top covers 262 and 264 may include curved upturned flanges 266 and 267 that run longitudinally along opposite sides thereof to prevent the mattress 106 from sliding side-to-side off the unfolded frame 104. The top covers 262 and 264 may be made from wood, metal, plastic, or composite materials. The top covers 262 and 264 may have cutouts (not shown) to reduce their mass. In one case, the cutouts may be aligned to have a honeycomb structure. In another case, the top covers include one or more materials such as twinwall, polycarbon twinwall, a composite material, carbon fiber, carbon fiber nomex, aluminum, titanium, fiberglass, and the like.

Figure 2G:
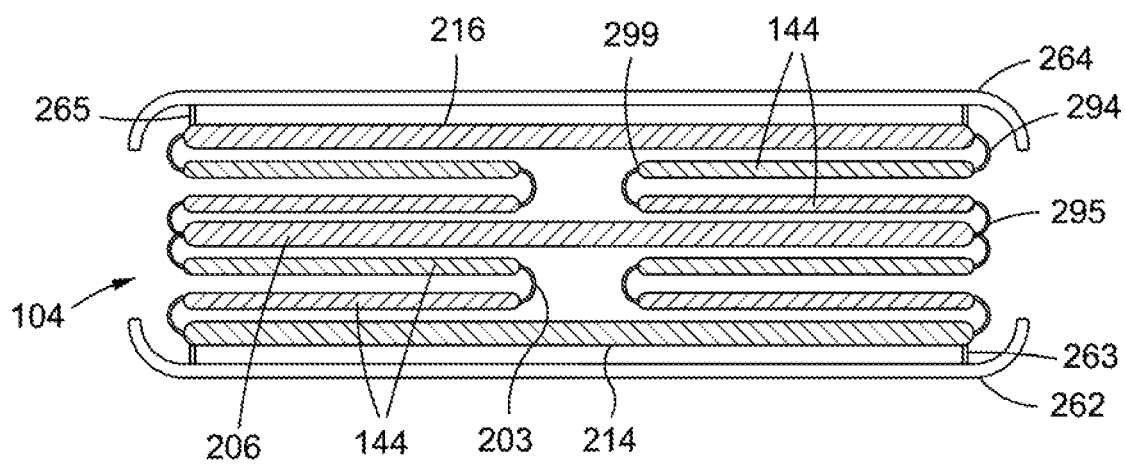
FIG. 2G shows the folding frame in a folded configuration suitable for being stowed.

FIG. 2G shows the folding frame 104 after it is folded to a compact or collapsed configuration between the top covers 262 and 264 at which to be suitable for storage. In this case, the top covers 262 and 264 are not rotated towards one another but lie alongside the end panels 214 and 216 of the folding frame 104. In the collapsed configuration of the folding frame 104, the end panels 214 and 216 and the side panels 144 are stacked one above the other between opposite sides of the dividing panel 206 and the top covers 262 and 264. As shown, vertical hinges 203 join one side panel 144 to an adjacent side panel, and vertical hinges 295 join the side panels to the adjacent divider panel 206. Each end panel 214 and 216 is joined to one of the side panels 144 by hinges 294 therebetween. The top covers 262 and 264 are joined to respective end panels 214 and 216 by horizontal hinges 263 and 265.

Collapsing the frame 104 to its folded configuration initially requires that the pair of top covers 262 and 264 be lifted off and rotated away from the upstanding side panels 144 shown in FIG. 2D. During this process, each top panel 262 and 264 is rotated through an angle of approximately 270 degrees to a position overlying a respective end panel 214 and 216. As seen in its folded configuration of FIG. 2E, the end panels, side panels, dividing panel and top covers of the folded frame 104 are all arranged in a compact stack and aligned parallel to one another.

While the folding frame 104 may be transported or stowed once it has been collapsed, a storage bag (not shown) may be provided in which to carry the folded frame. This storage bag may be made of a fabric such as cotton, nylon, rayon, polyester or similar fabric and any of these may have fire-retardant properties. The storage bag may be made of fire-retardant materials or materials that have inherent or added fire-retardant properties like canvas, woven synthetic materials, woven natural materials, or treated vinyl. In one embodiment, the bag comprises a mouth with a drawstring to be pulled to close the mouth.

Figure 3A:
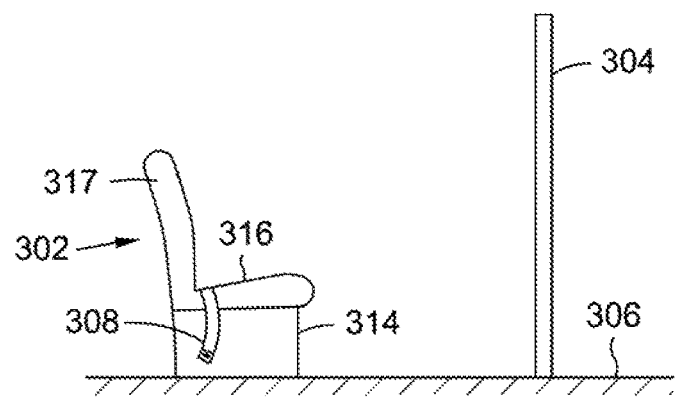
FIG. 3A shows a single aircraft seat spaced from and facing an upstanding structural component of an aircraft.

Turning now to FIG. 3A of the drawings, there is shown an aircraft seat 302 being spaced from and facing an upstanding structural component 304 of an aircraft, such as a vertical wall or the door of a closet. Each of the seat 302 and the upstanding component 304 are fixed to the floor 306 of the aircraft. As in the case of the aircraft seats 102 shown in FIG. 1A, the seat 302 of FIG. 3A has the standard pair of seat belts hanging from opposite sides thereof, only one of which 308 being visible.

Figure 3B:
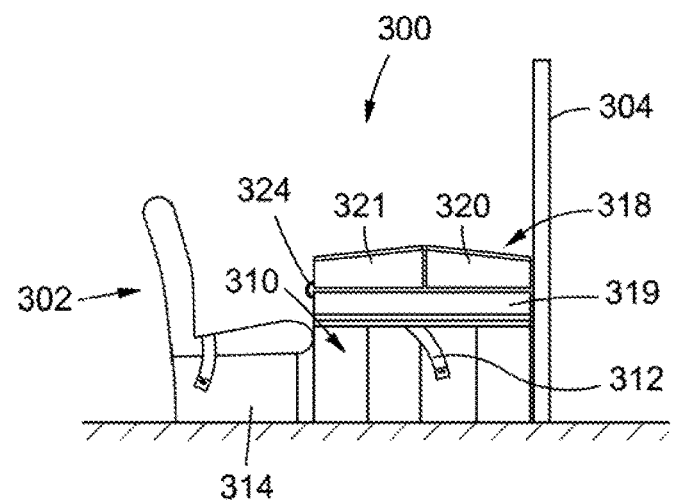
FIG. 3B shows a portable bed according to another preferred embodiment including a folding frame and a folding mattress laying folded on the frame, wherein the bed extends between the aircraft seat and the upstanding structural component shown in FIG. 3A.

FIG. 3B shows a portable bed 300 that includes a folding frame 310 and is located between the aircraft seat 302 and the opposite upstanding structural component (e.g. wall) 304. The folding frame 310 has a retaining strap (such as a seat belt) 312 extending therefrom and being of sufficient length to be wrapped around the base 314 of the seat 302, whereby to attach the folding frame 310 to the seat 302.

The folding frame 310 of the portable bed 300 may be identical to that designated 104 and disclosed when referring to FIGS. 1A-2G. Therefore, details of the folding frame 310, which is shown in FIG. 3B in its unfolded configuration, will not be once again explained. The bed 300 also includes a folding mattress 318 that is shown in FIG. 3B in a folded configuration laying on top of the folding frame 310. By way of example, the folding mattress 318 includes three mattress sections 319, 320 and 321 that are pivotally connected end-to-end and rotatable relative to one another around vertical hinges 324 which may any of the hinges described above. As shown, a relatively long torso mattress section 319 at one end of the mattress 318 is seated on top of the folding frame 310. Two adjacent relatively short head and neck sections 320 and 321 at the opposite end of mattress 318 are pivotally connected together and rotated with one another around a vertical hinge 324 so as to lie end-to-end and on top of the torso mattress section 319.

Figure 3C:
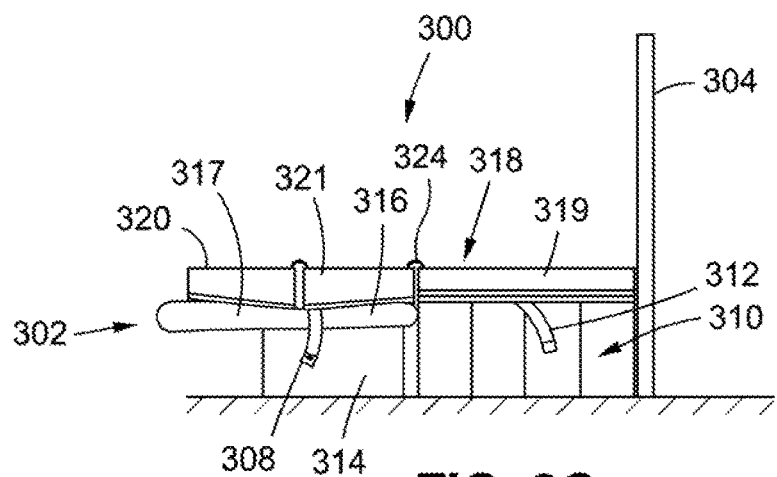
FIG. 3C shows the portable bed with the folding mattress thereof laying unfolded on the folding frame and the aircraft seat of FIG. 3B.

As shown in FIG. 3C, the back 317 of the aircraft seat 302 has been rotated backwards to a reclined position such that the seat and back 316 and 317 lie in horizontal alignment with one another above the seat base 314. In this case, the folding mattress 318 is unfolded, such that the adjacent relatively short head and neck mattress sections 320 and 321 are rotated with one another around the aforementioned hinge 324 through an angle of about 180 degrees so as to lie against and be supported by the seat and back 316 and 317, whereby all three of the mattress sections 319-321 are now positioned in horizontal, end-to-end alignment between the aircraft seat 302 and the upstanding structural component 304. Either one or both of the seat belts 308 and/or 312 may be wrapped around a sleeping passenger to hold him in place on the unfolded mattress 318 after the bed 300 has been fully deployed in the manner shown in FIG. 3C.

It is within the scope of this invention to substitute a folding mattress having a pair of end sections that are pivotally connected together and rotatable relative to one another for the folding mattress 318 shown in FIGS. 3B and 3C having three mattress sections 319-321. In that case, the pair of mattress sections would ideally have an identical length.

The invention claimed is:

1. A combination comprising:
 a first seat having a seat portion and a back portion standing upwardly from the seat portion;
 a second seat having a seat portion and a back portion standing upwardly from the seat portion, said first and second seats being spaced apart and facing one another;
 a mattress supporting frame located between said first and second seats; and
 a mattress on which an individual sleeps, said mattress having first and opposite ends and an intermediate section therebetween, said mattress having a length such that the first end thereof rests on the seat portion of said first seat, the opposite end rests on the seat portion of said second seat, and said intermediate portion rests on said mattress supporting frame,
 said mattress supporting frame including a plurality of panels that are pivotally connected one to another, said plurality of panels being rotated relative to each other so as to move outwardly and away from one another so that said mattress supporting frame has an expanded unfolded configuration at which to support the intermediate section of said mattress thereon, and said plurality of panels being rotated relative to each other so as to move inwardly and towards one another so that said mattress supporting frame has a collapsed folded configuration at which said plurality of panels lie one on to of the other.

2. The combination recited in claim 1, wherein the rotation of said plurality of panels relative to each other and outwardly and away from one another is limited to said mattress supporting frame having a zig-zag shape in said expanded unfolded configuration thereof.

3. The combination recited in claim 1, wherein said plurality of panels of said mattress supporting frame are pivotally connected in vertical side-to-side alignment to one another by means of respective hinges located between adjacent ones of said panels.

4. The combination recited in claim 1, wherein said plurality of panels of said mattress supporting frame surround an open area when said mattress supporting frame is in said expanded unfolded configuration, and wherein said plurality of panels are arranged in parallel alignment with one another in a stack when said mattress supporting frame is in said collapsed folded configuration.

5. The combination recited in claim 4, wherein the open area of said mattress supporting frame is divided into first and second open cells by means of a dividing panel that runs laterally across the middle of said mattress supporting frame and through said open area thereof when said frame is in said expanded unfolded configuration.

6. The combination recited in claim 5, further comprising first and second restraining belts extending from said dividing panel and sized to surround the individual sleeping on said mattress, said first and second restraining belts being connected to one another to hold the individual on said mattress.

7. The combination recited in claim 4, wherein said mattress supporting frame also includes first and opposite ends being pivotally connected to adjacent ones of said plurality of panels, such that the first end is located at the top of the stack of said parallel aligned panels and the opposite end is located at the bottom of the stack of said parallel aligned panels when said mattress supporting frame is in said collapsed folded configuration.

8. The combination recited in claim 7, wherein said mattress supporting frame also includes a first cover pivotally connected to said first end and rotatable relative to said first end between a first closed position lying horizontally over said mattress supporting frame at which to provide support for the intermediate section of said mattress when said mattress supporting frame is in said expanded unfolded configuration and a first open position lying vertically alongside said first end when said mattress supporting frame is in said collapsed folded configuration, and a second cover pivotally connected to said opposite end and rotatable relative to said opposite end between a second closed position lying horizontally over said mattress supporting frame at which to provide additional support for the intermediate section of said mattress when said mattress supporting frame is in said expanded unfolded configuration and a second open position lying vertically alongside said opposite end when said mattress supporting frame is in said expanded folded configuration.

9. The combination recited in claim 8, wherein the dividing panel of said mattress supporting frame has a cover seating shelf extending from each of the opposite sides thereof, the first and second covers of said mattress supporting frame resting upon respective ones of said cover seating shelves when said first and second covers are rotated to the first and second closed positions at which to lie over said mattress supporting frame and thereby provide support for the intermediate section of said mattress.

10. The combination recited in claim 9, further comprising a locking post standing upwardly from each of the cover seating shelves that extend from each of the opposite sides of said dividing panel of said mattress supporting frame, and a latch connected to and rotating with each of said first and second covers, each of the latches being rotated into surrounding engagement with a respective upstanding locking post when said first and second covers are rotated to the first and second closed positions so as to rest upon respective ones of said cover seating shelves at which said latches are releasably attached to one another to hold said first and second covers in end-to-end alignment with one another in the first and second closed positions.

11. The combination recited in claim 7, wherein said mattress supporting frame also includes at least a first frame attachment belt extending from said first end thereof to be connected to said first seat when said mattress supporting frame is in said expanded unfolded configuration and at least a second frame attachment belt extending from said opposite end thereof to be connected to said second seat when said mattress supporting frame is in said unfolded configuration, said first and second frame attachment belts attaching said mattress supporting frame in said expanded unfolded configuration to said first and second seats.

12. The combination recited in claim 1, wherein the first end of said mattress is pivotally connected and rotatable relative to the intermediate section of said mattress.

13. The combination recited in claim 12, wherein the opposite end of said mattress is pivotally connected and rotatable relative to the intermediate section of said mattress.

14. The combination recited in claim 13, wherein the first and opposite ends of said mattress are pivotally connected to the intermediate section of said mattress by means of respective hinges lying therebetween.

15. The combination recited in claim 1, wherein at least the intermediate section of said mattress includes an upper foam layer and a lower layer lying below said upper foam layer, said lower layer being harder than said upper foam layer.

16. A combination comprising:
a seat having a seat portion and a back portion standing upwardly from said seat portion and adapted to recline backwards and downwards towards said seat portion such that said back and seat portions are aligned in substantially horizontal end-to-end alignment with one another;
a mattress supporting frame located adjacent the seat portion of said seat; and
a mattress on which an individual sleeps, said mattress having first and opposite ends, the first end of said mattress laying on and being supported by said mattress support frame, and the opposite end of said mattress laying on and being supported by the seat and back portions of said seat when said back portion is reclined backwards and downwards towards said seat portion,
said mattress supporting frame having first and opposite sides that are hingedly connected to one another, said first and opposite sides being rotated away from one another at which said frame is expanded so as to support the first end of said mattress, and said first and second sides being rotated towards one another at which said first and second sides are folded side-by-side one another.

17. The combination recited in claim 16, further comprising a vertically upstanding structure located in front of and spaced from said seat, said mattress supporting frame located between said seat and said vertically upstanding structure.

18. The combination recited in claim 17, wherein said vertically upstanding structure is a wall.

19. The combination recited in claim 16, wherein the first and opposite ends of said mattress are hingedly connected together such that the opposite end of said mattress is rotatable relative to said first end thereof between a first position laying on the seat and back portions of said seat and a second position laying on each of said first end and said mattress supporting frame on which said first end lays.

20. The combination recited in claim 16, wherein each of the first and opposite sides of said mattress supporting frame has a zig-zag shape when said first and second sides are rotated away from one another and said frame is expanded.

21. A combination comprising:
a seat having a seat portion and a back portion standing upwardly from said seat portion and adapted to recline backwards and downwards towards said seat portion such that said back and seat portions are aligned in substantially horizontal end-to-end alignment with one another;

a mattress supporting frame located adjacent the seat portion of said seat; and a mattress on which an individual sleeps, said mattress having first and opposite ends, the first end of said mattress laying on and being supported by said mattress supporting frame, and the opposite end of said mattress laying on and being supported by the seat and back portions of said seat after said back portion is reclined backwards and downwards towards said seat portion, the first and opposite ends of said mattress being hingedly connected together such that the opposite end of said mattress is rotatable relative to said first end thereof between a first position laying on the seat and back portions of said seat and a second position laying on each of said first end and said mattress supporting frame on which said first end lays.

22. The combination recited in claim 21, wherein said mattress supporting frame includes a frame attachment belt extending therefrom to surround the first end of said mattress after the opposite end of said mattress is rotated relative to said first end to said first position laying on the seat and back portions of the seat.

\* \* \* \* \*